United States Patent
Allinger et al.

(10) Patent No.: US 6,892,937 B2
(45) Date of Patent: May 17, 2005

(54) METHOD AND CONFIGURATION FOR OPERATING A MULTISTAGE COUNTER IN ONE COUNTING DIRECTION

(75) Inventors: Robert Allinger, Unterhaching (DE); Wolfgang Pockrandt, Reichertshausen (DE)

(73) Assignee: Infineon Technologies AG, Munich (DE)

( * ) Notice: Subject to any disclaimer, the term of this patent is extended or adjusted under 35 U.S.C. 154(b) by 435 days.

(21) Appl. No.: 10/157,640

(22) Filed: May 29, 2002

(65) Prior Publication Data

US 2002/0191733 A1 Dec. 19, 2002

Related U.S. Application Data

(63) Continuation of application No. PCT/DE00/04213, filed on Nov. 27, 2000.

(51) Int. Cl.[7] .............................................. G06F 17/00
(52) U.S. Cl. .................. 235/375; 235/78 A; 235/61 FB
(58) Field of Search ............................ 235/375, 61 FB, 235/78 A; 178/42

(56) References Cited

U.S. PATENT DOCUMENTS 5,264,689 A   11/1993   Maes et al.

FOREIGN PATENT DOCUMENTS

| EP | 0 268 106 A2 | 5/1988 |
|----|--------------|--------|
| EP | 0 292 658 A2 | 11/1988 |
| EP | 0 321 727 A1 | 6/1989 |
| EP | 0 618 591 A1 | 10/1994 |
| GB | 2 187 011 A  | 8/1987 |
| WO | WO 97/21197  | 8/1997 |
| WO | WO 97/45815  | 12/1997 |

*Primary Examiner*—Karl D. Frech
(74) *Attorney, Agent, or Firm*—Laurence A. Greenberg; Werner H. Stemer; Gregory L. Mayback

(57) ABSTRACT

A method for operating a multistage counter in only one counting direction is described. The counting value of a single-stage auxiliary counter that can be changed in only one counting direction is changed in predetermined counting values of the multistage counter. The respective counting value states of the multistage counter and of the single-stage auxiliary counter are registered. First authenticity data is generated by logically linking the counting value of the auxiliary counter to supplementary data.

7 Claims, 1 Drawing Sheet

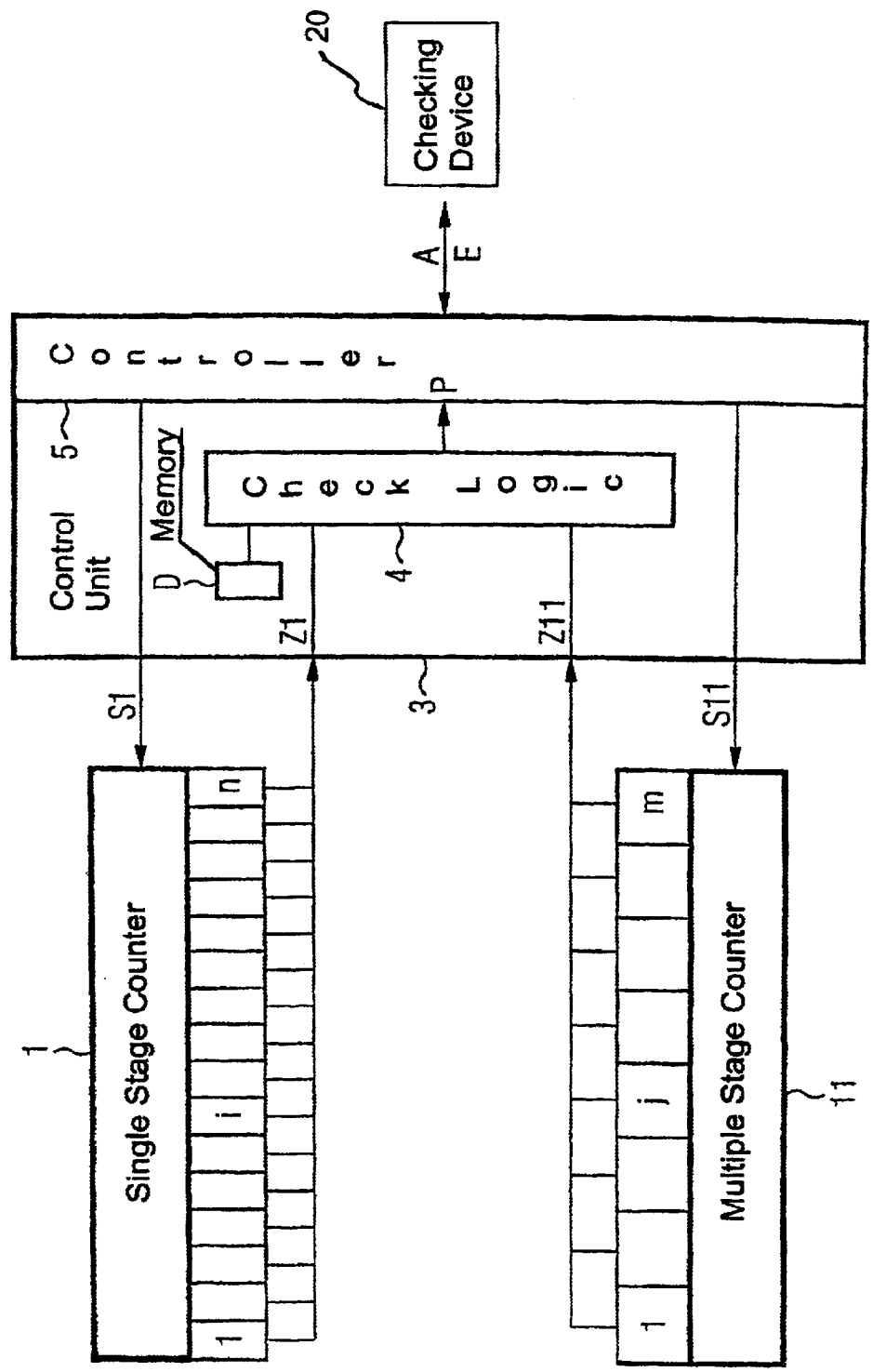

METHOD AND CONFIGURATION FOR OPERATING A MULTISTAGE COUNTER IN ONE COUNTING DIRECTION

CROSS-REFERENCE TO RELATED APPLICATIONS

This application is a continuation of copending International Application No. PCT/DE00/04213, filed Nov. 27, 2000, which designated the United States and was not published in English.

BACKGROUND OF THE INVENTION

Field of the Invention

The invention relates to a method and a configuration for operating a multistage counter in one counting direction.

Nowadays, an unlimited number of application areas are known in which event counting is to take place. These events may be the frequency of use of a piece of equipment, the passing of persons or vehicles or objects, the registering of a telephone counting clock, the registering of driving power for instance an odometer in a passenger car or an operating time counter of any particular piece of equipment, and last but not least the registered working time or attendance time of an employee at his/her workplace. All these cases are characterized in that they are registered with the maximum possible precision, i.e. that as a rule a high value range of counting values is covered. Furthermore, in the aforesaid cases, there is generally the desire that the counting result cannot be tampered with, e.g. cannot be reset. Such a requirement can be reliably implemented using a single-stage counter that can only count in an incrementing or decrementing fashion from its previous counter reading. This can easily be implemented, for example, by an EEPROM, it then being necessary to provide an EEPROM cell for each counting value, and the EEPROM being capable either only of being written to or only being cleared depending on whether incrementing or decrementing counting is provided.

The first-mentioned requirement, specifically that the value range covered by the counter is to be as large as possible, makes it necessary to provide an EEPROM memory with a corresponding number of memory cells with such a method of implementation. Expressed in numbers, this results in that, for example, in order to obtain a maximum counter reading of 255, precisely 255 counter cells are required. However, nowadays it is now customary to make such configurations as small as possible. The use of a multistage counter with 8 bits, i.e. 8 counter cells also gives rise to a maximum counter reading of 255. However, such a multistage counter (8-bit binary counter) has the disadvantage that when the next counter position is changed the preceding counter position is reset. This leads to a situation in which the implementation of a multistage counter which counts in only one direction and at the same time cannot be tampered with is possible only with great difficulty.

Published, European Patent Application EP 0 321 727 A describes a circuit configuration in which a plurality of EEPROM cells are disposed in a row. Here, a plurality of rows are in turn connected together. The memory cells of one respective row constitute a uniform value level, it being possible to clear the memory contents of a row, by logic monitoring, only if a carry-over into the next highest row has taken place. The configuration disclosed in this publication has precisely the previously mentioned disadvantages of susceptibility to tampering since, as a result of the logic circuit being influenced, unidirectional counting is not reliably ensured. A similar configuration, which is only somewhat more complex, is presented in Published, European Patent Application EP 0 618 591 A, an auxiliary memory cell being provided for rewriting for each next highest row, which auxiliary memory cell can be programmed and also cleared again. This configuration is also easy to tamper with because the auxiliary memory cells can both be written to and cleared.

U.S. Pat. No. 5,264,689 discloses a reloadable telephone card that has a credit counter and a debit counter. When the card is reloaded, a maximum counting value is set on the credit counter. Whenever a unit is used up, a memory cell is reprogrammed and the debit counter is incremented. As soon as the counter readings of the debit counter and credit counter are the same, the card is "empty". In order to reload the card, it is then necessary first to increment the credit counter. In order to prevent misuse, neither counter can be reset. The result of this is that when the maximum value of the counters is reached the card can no longer be used.

SUMMARY OF THE INVENTION

It is accordingly an object of the invention to provide a method and a configuration for operating a multistage counter in one counting direction that overcome the above-mentioned disadvantages of the prior art methods and devices of this general type, in which protection against tampering is increased in a simple way.

With the foregoing and other objects in view there is provided, in accordance with the invention, a method for operating a multistage counter in only one counting direction. The method includes changing a counting value of a single-stage auxiliary counter, which counts in only one counting direction, in dependence on predetermined target values of the multistage counter. Counting values of the multistage counter and of the single-stage counter are registered. The counting value of the single-stage auxiliary counter is logically linked with supplementary data to form first authenticity data. The first authenticity data together with a counting value of the multistage counter are transmitted to a checking device. The counting value of the single-stage auxiliary counter is recovered in the checking device resulting in a recovered counting value. Second authenticity data is generated by logically linking the recovered counting value of the single-stage auxiliary counter with the supplementary data. Finally, the first authenticity data is compared with the second authenticity data.

By simultaneously operating a single-stage counter, which only either increments or decrements, together with the multistage counter, which counts the actual result, it is ensured, by a comparison, that the counting value of the multistage counter corresponds, at least in terms of the order of magnitude, to the counting value of the single-stage counter. By logically linking the counting value of the single-stage counter to supplementary data to form first authenticity data, the counting value of the single-stage counter is made available, when the forwarded authenticity data is evaluated, in a way that is imperceptible to the public and is available for determining the authenticity. The possibility of tampering is therefore eliminated with simple measures because not only a fixed keyword and/or a random number which is transmitted in advance by the checking device, but also the counting value of the auxiliary counter which changes in accordance with the granularity of the auxiliary counter are made available for authenticity checking.

This is further improved by virtue of the fact that there is additional logic linking to the counting value of the multistage counter.

A further improvement is obtained by virtue of the fact that a part of the supplementary data is a random number that is transmitted in advance by the checking device.

In accordance with an added mode of the invention, there is the step of logically linking the counting value of the multistage counter to the first authenticity data and/or the second authenticity data.

In accordance with another mode of the invention, there is the mode of transmitting from the checking device a random number that forms the supplementary data.

With the foregoing and other objects in view there is provided, in accordance with the invention, a circuit configuration. The circuit configuration contains a multistage counter operable in only an incrementing fashion or a decrementing fashion. The multistage counter has stages and a counting value of a respective stage is reset to an initial value when a counting value of a following stage changes. A single-stage auxiliary counter is provided and is operable in either an incrementing fashion or a decrementing fashion. The single-stage auxiliary counter is changed in dependence on predetermined counting values of the multistage counter. A memory device is provided. A logic linking device is connected to the single-stage auxiliary counter and to the memory device such that the logic linking device generates authenticity data by logically linking a counting value of the single-stage auxiliary counter with supplementary data stored in the memory device. The logic linking device is further connected to the multistage counter.

In accordance with an added feature of the invention, a first part of the supplementary data is a keyword and a second part of the supplementary data is a random number.

Other features which are considered as characteristic for the invention are set forth in the appended claims.

Although the invention is illustrated and described herein as embodied in a method and a configuration for operating a multistage counter in one counting direction, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing is a block circuit diagram of an exemplary embodiment of a counter circuit according to the invention.

DESCRIPTION OF THE PREFERRED EMBODIMENTS

Referring now to the single FIGURE of the drawing, there is shown an exemplary embodiment of a counter circuit having an m-stage counter 11 with m=8. This is to be understood as an 8-bit binary counter in the illustration. The counter 11 can thus count from 0 to 255, i.e. 256 counting positions. The counter 11 is connected to a control unit 3 that feeds a counting signal S11 to the counter 11. Whenever the counting signal S11 is fed, the counter 11 is changed by 1, the change taking place in the same direction as a preceding change. Therefore, the counter 11 that is illustrated symbolically in the FIGURE is configured in such a way that it either only counts in an incrementing fashion or only in a decrementing fashion. The respective counter reading of the multistage counter 11 is fed to a check logic 4 as a counting value signal Z11. Furthermore, a single-stage counter 1 is provided which, in this exemplary embodiment, has n cells with n=16. The counter 1 that is illustrated symbolically in the FIGURE is constructed in such a way that it also only counts in one counting direction, specifically from 0 to 15, i.e. 16 counting positions. The single-stage counter 1 receives a counting signal S1 from the control unit 3, after which it is moved on by one counting value. The counter reading of the single-stage counter 1 is fed to the check logic 4 in the control unit 3 as a check counting value signal Z1. The check logic 1 compares the counting value signal Z11 with the check counting value signal Z1 and outputs to a counter controller 5 a signal that is determined as a function of the comparison, via a terminal P.

The two counters 11 and 1 are embodied as EEPROM cells. There is provision here that, in accordance with the known operation of a binary counter, the individual memory cells are written to or cleared in accordance with the rules of the incrementation or decrementation. Likewise, the single-stage check counter 1 is also composed of EEPROM cells, the individual cells 1 to n being, in succession, only written to or only cleared.

The check logic 4 is connected to a memory D in which supplementary data is stored. During authentication of the configuration, the check logic 4 logically links the supplementary data to the counting value of the single-stage counter 1 and thus generates first authenticity data. The supplementary data is ideally composed of a keyword and a random number that is transmitted in advance by a checking device 20.

If the checking device 20 requests the configuration, via the input E, to authenticate itself, the authenticity data is generated by logically linking the counting value of the auxiliary counter 1 to the supplementary data, and is output by the control unit 3 via an output A. At the same time, the control unit 3 determines the counting value of the multistage counter 11 and also transmits it to the checking device 20 via the output A. For authenticity checking, the counting value of the auxiliary counter 1 is determined or recovered in the checking device 20 that wishes to check the authenticity, and second authenticity data is generated therefrom. Authenticity is found to apply if the second authenticity data corresponds to the first authenticity data. If authenticity is not found to apply, the exchange of data with the configuration is terminated. The second authenticity data results from the logic linking of the recovered counting value of the auxiliary counter 1 to the supplementary data which, insofar as it is not known to the checking device 20, is also transmitted via the output A.

As a refinement it is also conceivable if the random number is not predefined by the checking device 20 but rather by the configuration that is to be checked. In this case, the random number must, however, be a part of the transmitted supplementary data, which was not the case in the preceding example as the second authenticity data was generated here with the previously predefined random number and the transmitted supplementary data insofar as it was not known by the checking device 20.

As a further refinement it is possible also to logically link the counting value of the multistage counter 11 to the first authenticity data. In a way that is analogous to what is described above, this must then also be carried out in the checking device 20 in order to generate the second authenticity data, the counting value of the multistage counter 11 not being recovered as it is publicly known and is transmitted to the checking device 20.

If authenticity has been reliably established, the further typical operation of the counter circuit illustrated in the FIGURE takes place. Basically there is provision that the counting signal S11 is to be output by the control unit 3 wherever there is an input signal at the input E. Here, the counter readings of the two counters 1 and 11 are checked in advance by the check logic 4 by the counting value signal Z11 and the check counting value signal Z1. If both are, for example, 0, the check logic 4 determines that there is correspondence and, by a check signal P, allows the counting signal S11 to be output via the counter controller 5.

There is now provision that both counters count from 0 to 255. Therefore the single-stage check counter 1 also receives a check counting signal S1 from the counter controller 5 in the control unit 3 at every sixteenth counting signal S11 which is supplied to the multistage counter 11. For tamper-free operation, the check logic is then configured in such a way that it monitors that the counting value of the counter 11 matches the counting value of the check counter 1 which has just been reached. That is to say, in the exemplary embodiment illustrated, the counting value of the counter 11 must not be lower than (i×16)−1. The same applies to a decrementing configuration; here, too, the counter 11 must be in a range that matches the counting value of the check counter 1, in accordance with the counting logic.

As soon as the check logic 4 determines that there is no correspondence, a fault signal is output via the terminal P. However, the invention is not restricted to the exemplary embodiment illustrated in the FIGURE. Instead, it is also conceivable that, in particular in the case of a very large counting value range of the counter 11 to be covered, in order to achieve a saving in counter cells of the single-stage counter, the counter 11 is not operated linearly but rather decadically for example. That is to say the single-stage counter would obtain, for example in the case of 10., 100., 1000. etc., the counting signal S11 from the counter controller 5 a check counting signal S1. In order to monitor tamper-free operation, the check logic 4 must be of an appropriate configuration, i.e. in such a case the counting value of the counter 11 must correspond to the order of magnitude assigned to the respective counting value of the check counter 1. It is equally conceivable for the relationship between the counting value of the counter 11 and the counting value of the check counter 1 to correspond to a function that is logarithmic, exponential or of any other suitable and desired type. This can then be applied both to incrementing and decrementing counter configurations.

In conclusion, it is to be noted that the counter 11 and the check counter 1 do not necessarily have to count in the same direction. Instead, it is also possible to provide for the one counter to increment and the respective other counter to decrement. The sole precondition for tamper-free operation is that the check counter counts only in one direction and the check logic 4 is configured in such a way that the counting value of the counter 11 has a logical relationship with the counting value of the check counter 1.

We claim:

1. A method for operating a multistage counter in only one counting direction, which comprises the steps of:

changing a counting value of a single-stage auxiliary counter, which counts in only one counting direction, in dependence on predetermined target values of the multistage counter;

registering counting values of the multistage counter and of the single-stage counter;

logically linking the counting value of the single-stage auxiliary counter with supplementary data to form first authenticity data;

transmitting the first authenticity data together with said counting value of the multistage counter, to a checking device;

recovering the counting value of the single-stage auxiliary counter in the checking device resulting in a recovered counting value;

generating second authenticity data by logically linking the recovered counting value of the single-stage auxiliary counter with the supplementary data; and comparing the first authenticity data with the second authenticity data.

2. The method according to claim 1, which comprises logically linking the counting value of the multistage counter to at least one of the first authenticity data and the second authenticity data.

3. The method according to claim 1, which comprises transmitting from the checking device a random number that is used for forming the supplementary data.

4. A circuit configuration, comprising:

a multistage counter operable in only one of an incrementing fashion and a decrementing fashion, said multistage counter having stages and a counting value of a respective stage being reset to an initial value when a counting value of a following stage changes;

a single-stage auxiliary counter operable in only one of an incrementing fashion and a decrementing fashion, said single-stage auxiliary counter being changed in dependence on predetermined counting values of said multistage counter;

a memory device; and a logic linking device connected to said single-stage auxiliary counter and to said memory device such that said logic linking device generates authenticity data by logically linking a counting value of said single-stage auxiliary counter with supplementary data stored in said memory device, said logic linking device further connected to said multistage counter.

5. The circuit configuration according to claim 4, wherein a first part of the supplementary data is a keyword and a second part of the supplementary data is a random number.

6. The circuit configuration according to claim 4, wherein a part of the supplementary data is a keyword.

7. The circuit configuration according to claim 4, wherein a part of the supplementary data is a random number.

* * * * *

UNITED STATES PATENT AND TRADEMARK OFFICE
CERTIFICATE OF CORRECTION

PATENT NO. : 6,892,937 B2
DATED : May 17, 2005
INVENTOR(S) : Robert Allinger et al.

It is certified that error appears in the above-identified patent and that said Letters Patent is hereby corrected as shown below:

<u>Title page,</u>
Item [30], Foreign Application Priority Data, should read as follows:
-- Nov. 29, 1999   (EP) ……………………….. 991 23 705 --

Signed and Sealed this

Twelfth Day of July, 2005

JON W. DUDAS
*Director of the United States Patent and Trademark Office*